United States Patent
Ke et al.

(10) Patent No.: US 10,776,228 B2
(45) Date of Patent: Sep. 15, 2020

(54) DATA STORAGE DEVICE AND DATA STORAGE METHOD FOR OPTIMIZING THE DATA STORAGE DEVICE

(71) Applicant: Silicon Motion, Inc., Uhubei City, Hsinchu County (TW)

(72) Inventors: Kuan-Yu Ke, Zhubei (TW); Guan-Yao Huang, Kaohsiung (TW); Shen-Ting Chiu, Houlong Township, Miaoli County (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 167 days.

(21) Appl. No.: 16/016,089

(22) Filed: Jun. 22, 2018

(65) Prior Publication Data

US 2019/0065332 A1    Feb. 28, 2019

(30) Foreign Application Priority Data

Aug. 28, 2017 (TW) .............................. 106129148 A (51) Int. Cl.
*G06F 11/00* (2006.01)
*G06F 11/20* (2006.01)
*G06F 3/06* (2006.01)
*G06F 12/02* (2006.01)

(52) U.S. Cl.
CPC .......... *G06F 11/2094* (2013.01); *G06F 3/064* (2013.01); *G06F 3/068* (2013.01); *G06F 3/0619* (2013.01); *G06F 3/0658* (2013.01); *G06F 12/02* (2013.01); *G06F 2201/82* (2013.01)

(58) Field of Classification Search
CPC ...... G06F 11/2094; G06F 12/02; G06F 3/064; G06F 3/068; G06F 3/0658; G06F 3/0619; G06F 2201/82; G06F 12/0246; G06F 2212/7206; G06F 2212/7207; G06F 3/0644; G06F 3/0607
USPC ........................................................ 714/6.12
See application file for complete search history.

(56) References Cited

U.S. PATENT DOCUMENTS

| | | |
|---|---|---|
| 8,072,788 B1 | 12/2011 | Urabe |
| 9,239,781 B2 * | 1/2016 | Jones .................. G06F 12/0246 |
| 2008/0052446 A1 * | 2/2008 | Lasser ................. G06F 12/0246 |
| | | 711/103 |

(Continued)

FOREIGN PATENT DOCUMENTS

TW             201626230 A     7/2016

*Primary Examiner* — Yair Leibovich
(74) *Attorney, Agent, or Firm* — McClure, Qualey & Rodack, LLP (57) ABSTRACT

A data storage device includes a flash memory, a controller and a random-access memory. The flash memory includes a plurality of planes, and each plane includes a plurality of blocks. A portion of blocks in each of the planes constitutes a super block, so that the flash memory includes a plurality of super blocks. The controller is coupled to the flash memory. When a first block of at least one first super block of the super blocks is damaged, and a second block of a second super block in the position corresponding to the damaged block is normal, the controller merges the second block of the second super block with the first super block to replace the first block. The random-access memory stores a compression table to record position information about the first block in the first super block and the number information of the second block.

16 Claims, 6 Drawing Sheets

(56) References Cited

U.S. PATENT DOCUMENTS

| | | | |
|---|---|---|---|
| 2010/0228940 A1* | 9/2010 | Asnaashari | G06F 12/0246 |
| | | | 711/170 |
| 2018/0121097 A1* | 5/2018 | Kim | G11C 29/52 |
| 2018/0151251 A1* | 5/2018 | Oh | G06F 3/0619 |
| 2018/0364947 A1* | 12/2018 | Jean | G06F 3/0608 |
| 2018/0366210 A1* | 12/2018 | Park | G06F 11/1048 |
| 2018/0374549 A1* | 12/2018 | Padilla | G11C 16/3422 |

* cited by examiner

DATA STORAGE DEVICE AND DATA STORAGE METHOD FOR OPTIMIZING THE DATA STORAGE DEVICE

CROSS REFERENCE TO RELATED APPLICATIONS

This application claims priority of Taiwan Patent Application No. 106129148 filed on Aug. 28, 2017, the entirety of which is incorporated by reference herein.

BACKGROUND OF THE INVENTION

Field of the Invention

The disclosure generally relates to a data storage device and a data storage method for optimizing the data storage device and more particularly, to a data storage device and a data storage method which record the reorganization and merging of data blocks using a compression table.

Description of the Related Art

Flash memory is a general non-volatile data storage device, which is utilized for erasing and programming electrically. For example, NAND flash may be utilized in a memory card, a USB flash device, SSD, eMMC or UFS.

Because flash memory has many data blocks which can become damaged after long-term use, the data will become invalid and eventually cannot be read or written normally. Therefore, what is needed is an effective data storage method and data storage device to reorganize and merge the data blocks in order to confirm the performance and reliability of accessing data.

BRIEF SUMMARY OF THE INVENTION

In order to solve the aforementioned problem, the invention proposes a data storage device and a data storage method to optimize the data storage device. The damaged data blocks are assembled and merged efficiently to obtain more super blocks which are not damaged. In addition, the compression table is utilized to record a portion of blocks which have been changed and merged to avoid occupying too much storage space and to effectively maintain the performance and reliability of accessing data.

In one aspect of the invention, the present invention provides a data storage device which includes a flash memory, a controller, and a random access memory (RAM). The flash memory includes a plurality of storage planes. Each of the storage planes comprises a plurality of blocks, and a portion of the blocks in each storage plane constitutes a super block, so that the flash memory comprises a plurality of super blocks. The controller is coupled to the flash memory. When at least one first block of at least one first super block of the super blocks is damaged, and at least one second block of at least one second super block of the super blocks corresponding to the position of the damaged block is normal, the controller merges the second block of the second super block with the first super block to replace the first block. The RAM stores a compression table to record position information of the first block in the first super block and number information of the second block.

In another aspect of the invention, the present invention provides a data storage method for optimizing the data storage device. The data storage device includes a flash memory, a controller and a RAM, and the flash memory comprises a plurality of storage planes. Each of the storage planes comprises a plurality of blocks. The data storage method includes utilizing a portion of the blocks in each storage plane to constitute a super block, so that the flash memory comprises a plurality of super blocks; and when at least one first block of at least one first super block of the super blocks is damaged, and at least one second block of at least one second super block of the super blocks corresponding to the position of the damaged block is normal, the second block of the second super block is merged with the first super block to replace the first block; and position information of the first block in the first super block and number information of the second block are recorded in a compression table.

Other aspects and features of the present invention will become apparent to those with ordinarily skill in the art upon review of the following descriptions of specific embodiments of the data storage method and the data storage device.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
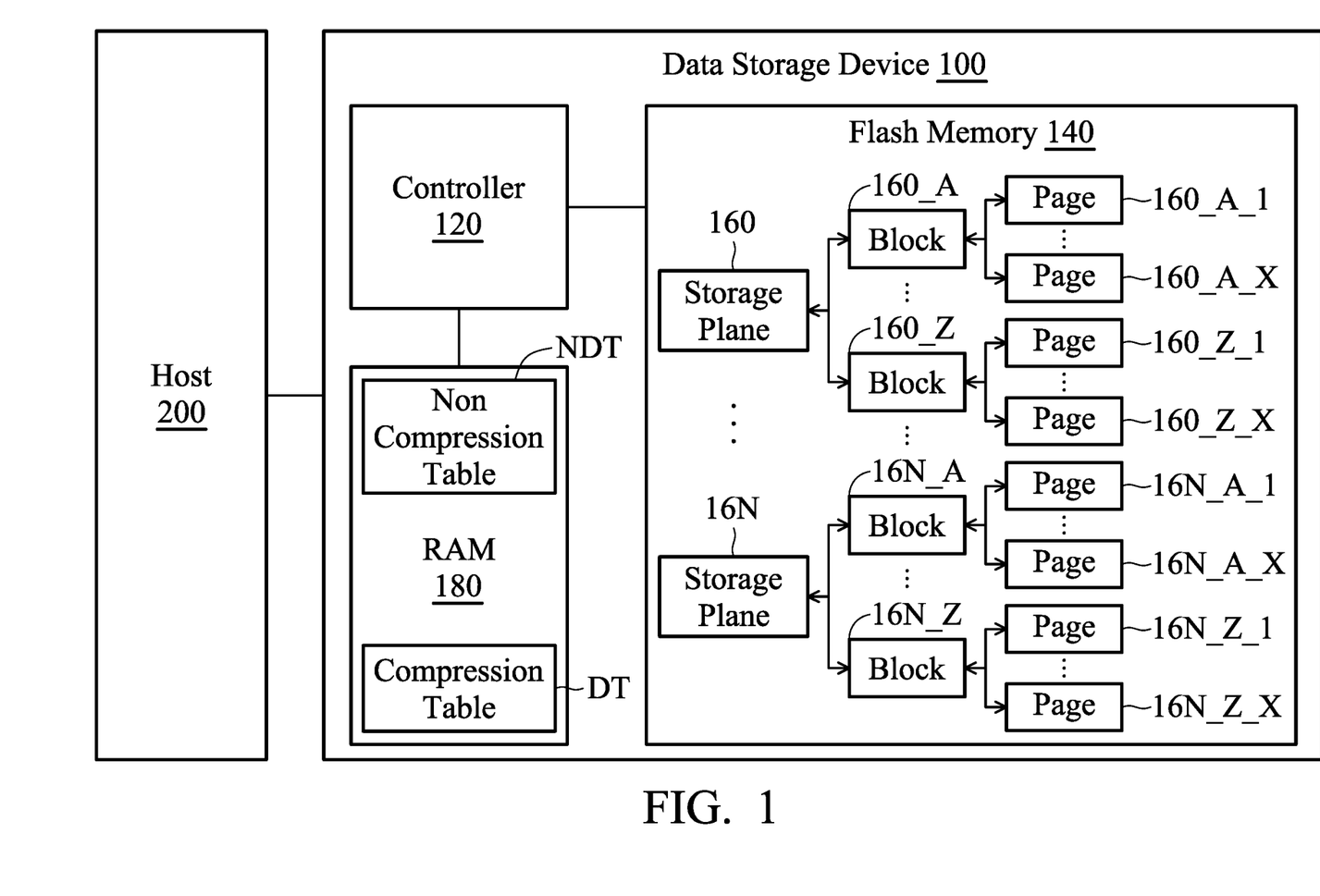
FIG. 1 is a schematic diagram of a data storage device and a host according to an embodiment of the invention.

FIG. 1 is a schematic diagram of a data storage device 100 and a host 200 according to an embodiment of the invention. In one embodiment, the data storage device 100 includes a controller 120, a flash memory 140 and a random access memory (RAM) 180. The data storage device 100 is coupled to the host 200 to transmit data and command or to receive data and command. The memory 140 can be non-volatile memory such as NAND flash. The data storage device 100 may include (but not limit to): a portable storage device (such as memory card complying with the standards of SD/MMC, CF, MS, XD or UFS), a solid state drive (SSD) and various kinds of embedded storage devices (such as embedded storage devices complying with the UFS or EMMC standards). The host 200 can be any one of various kinds of electronic devices, such as a cell phone, a tablet computer, a laptop computer, a navigating apparatus, a car system, or a processor inside one of the electronic devices listed above.

As shown in FIG. 1, the controller 120 is coupled to the flash memory 140 and the RAM 180. The RAM 180 is utilized to temporarily store and cache data that is needed by the controller 120, or to temporarily store data that will be written to the flash memory 140 by the host 200 in order to facilitate timely access to the data storage device 100. The controller 120 performs a read operation on the flash memory 140 by controlling the flash memory 140 with the unit of a cluster. In addition, the controller 120 is coupled to the flash memory 140 to transmit data and instructions or to receive data and instructions mutually. Furthermore, the controller 120 can be a read-only-memory (ROM) and a micro-controller with firmware code, and the micro-controller executes the firmware code to operate or access the memory 140.

The flash memory 140 includes a plurality of planes 160~16N. Specifically, each of the super blocks 160~16N includes a plurality of blocks 16N_A~16N_Z. In another embodiment, the flash memory 140 has four super blocks (CE0~CE3). The storage plane 160 includes the blocks 160_A~160_Z, and the storage plane 16N includes the blocks 16N_A~16N_Z. Regarding the storage plane 160, each of the blocks 160_A~160_Z further includes a plurality of pages. The block 160_A includes the pages 160_A_1~160_A_X, and the block 160_Z includes the pages 160_Z_1~160_Z_X. In addition, the pages 160_A_1~16N_Z_X are physical pages. When the controller 120 performs a write operation or a programming operation on the flash memory 140, it controls the flash memory 140 to perform the write or programming operation with the unit of a physical page.

Regarding the flash memory 140, each of the pages 160_A_1~16N_Z_X has a different physical address. In other words, each of the pages 160_A_1~16N_Z_X has a physical address, and each physical address of the pages 160_A_1~16N_Z_X is different. When a write operation is executed by the data storage device 100, the controller 120 determines the physical address of the flash memory 140 for writing or storing the data. In addition, the physical addresses are mapped to a plurality of respective logical addresses by the controller 120. Therefore, regarding the host 200, the host 200 reads or writes data which is stored in a logical address by the data storage device 100 through the logical address.

In one embodiment, a portion of the blocks in each storage plane 160~16N constitutes a super block, and the flash memory 140 includes a plurality of super blocks. When a first block of at least one first super block of the super blocks is damaged, and a second block of a second super block on the position corresponding to the damaged block is normal, the controller 120 merges the second block of the second super block with the first super block to replace the first block. The RAM 180 stores a compression table DT to record position information about the first block in the first super block and the number information of the second block. In another embodiment, the RAM 180 stores a non-compression table NDT to record each position information of the first super block and the number information of its corresponding block. For example, the non-compression table NDT and the compression table DT are shown below:

| Non-Compression Table NDT1 | | | | | | | | |
|---|---|---|---|---|---|---|---|---|
| | Storage Plane 160 | | Storage Plane 161 | | Storage Plane 162 | | Storage Plane 163 | |
| Super block XBLK0 | 0 | 1 | 0 | 1 | 0 | 1 | 0 | 1 |
| Super block XBLK1 | 2 | 3 | 2 | 3 | 2 | 3 | 2 | 3 |

As shown in the non-compression table NDT1, the super block XBLK0 consists of 8 blocks which are the blocks with numbers 0 and 1 of the storage plane 160, the blocks with numbers 0 and 1 of the storage plane 161, the blocks with numbers 0 and 1 of the storage plane 162, and the blocks with numbers 0 and 1 of the storage plane 163. For example, block number 0 of plane 160 is block 160_A, block number 1 of plane 160 is block 160_B, block number 0 of plane 161 is block 161_A, and so on. The super block XBLK1 consists of 8 blocks which are the blocks with the numbers 2 and 3 of the storage plane 160, the blocks with the numbers 2 and 3 of the storage plane 161, the blocks with the numbers 2 and 3 of the storage plane 162 and the blocks with the numbers 2 and 3 of the storage plane 163. For example, block number 2 of plane 160 is block 160_C, block number 3 of plane 160 is block 160_D, block number 2 of plane 161 is block 161_C, and so on.

Afterwards, damage occurs on block number 1 of the storage plane 163 of the super block XBLK0 (i.e., the block 163_A). Specifically, when data is not written into block 163_A of the storage plane 163 successfully, or block 163_A is not erased successfully, the controller 120 determines that block 163_A is damaged. In addition, in the embodiment, damage may also occur to block number 3 of storage plane 161, block number 3 of storage plane 162, and block number 2 of storage plane 166 of super block XBLK1.

When the controller 120 detects that the above blocks are damaged, it merges the normal blocks in other super blocks with super blocks XBLK0 and XBLK1, which have been damaged, in order to replace the damaged blocks. Afterwards, the compression table DT and the non-compression table NDT stored by the RAM 180 are updated to record the related information about the merging and changing of blocks. The updated compression table DT1 and the non-compression table NDT2 are shown below. In the non-compression table NDT2, the number of damaged blocks is highlighted. It should be noted that the highlight is for illustration, and the non-compression table NDT can operate without highlights.

| Non-Compression Table NDT2 | | | | | | | | |
|---|---|---|---|---|---|---|---|---|
| | Storage Plane 160 | | Storage Plane 161 | | Storage Plane 162 | | Storage Plane 163 | |
| Position | 0 | 1 | 2 | 3 | 4 | 5 | 6 | 7 |
| Super block XBLK0 | 0 | 1 | 0 | 1 | 0 | 1 | 0 | 5 |
| Super block XBLK1 | 2 | 3 | 2 | 8 | 2 | 7 | 4 | 3 |

The non-compression table NDT2 of the embodiment records that block number 5 of other super blocks replaces block number 7 of the super block XBLK0, block number 8 of other super blocks replaces block number 3 of the super block XBLK1, and block number 7 of other super blocks replaces block number 5 of the super block XBLK1, and so on. Therefore, after the merging and replacement of the blocks, both of the super blocks XBLK0 and XBLK1 are undamaged.

Because the information of all blocks is recorded by the non-compression table NDT1, it occupies lots of storage space of the RAM 180 when a large amount of data is accessed. Therefore, the compression table DT2 is provided by the present invention to record the data which changes on the original non-compression table NDT2 in order to increase the available storage space in the memory and accelerate the access speed.

The compression table DT2 is illustrated below:

| Compression Table DT1 | | | | | | | | |
|---|---|---|---|---|---|---|---|---|
| Position | 0 | 1 | 2 | 3 | 4 | 5 | 6 | 7 |
| Super block XBLK0 | 5 | 7 | | | | | | |
| Super block XBLK1 | 8 | 3 | 7 | 5 | 4 | 6 | | |

As shown above, the odd columns 1~7 contain the number information of the merged normal blocks, and the even columns 2~8 contain position information about the damaged blocks. In compression table DT1, information 5 and 7 of super block XBLK0 means that the block in position 7 of the non-compression table NDT2 is replaced by block number 5 of other super blocks. Similarly, information 8 and 3 in the super block XBLK1 means that the block in position 3 of the non-compression table NDT2 is replaced by block number 8 in other super blocks, and information 7 and 5 of super block XBLK1 means that the block in position 5 of the non-compression table NDT2 is replaced by block number 7 of other super blocks, and so on.

It should be noted that the controller 120 determines whether or not the number of damaged blocks in the super block exceeds half of the number of all blocks. If the number of damaged blocks in the super block does not exceed half of the number of all blocks, the controller 120 utilizes the compression table DT for recording which is stored in the RAM 180. If the number of damaged blocks in the super block exceeds half of the number of all blocks, the controller 120 utilizes the non-compression table NDT for recording which is stored in the RAM 180, since the size of the table cannot effectively be reduced by compression table DT.

The merging of blocks with the corresponding relationship and number of normal blocks and damaged blocks will be illustrated below. The super block will be divided to determine the normal blocks to be merged, if necessary.

| Non-Compression Table NDT3 | | | | |
|---|---|---|---|---|
| | Storage Plane 160 | Storage Plane 161 | Storage Plane 162 | Storage Plane 163 |
| Position | 0  1 | 2  3 | 4  5 | 6  7 |
| Super block XBLK0 | 0  1 | 0  X | 0  1 | X  1 |
| Super block XBLK1 | 2  3 | X  3 | 2  X | 2  3 |
| Super block XBLK2 | 4  X | 4  5 | X  5 | 4  5 |
| Super block XBLK3 | 6  7 | 6  7 | 6  7 | 6  X |
| Super block XBLK4 | X  X | X  X | X  X | X  9 |

Five super blocks XNLK0~XBLK4 are included in the embodiment of the non-compression table NDT3. X means that the block in that position is damaged. Firstly, the controller 120 determines which block has the lowest number of damaged blocks among the 5 super blocks XBLK0~XBLK4, and merges the normal blocks for recovery at a high priority. As shown in the non-compression table NDT3, there is only one damaged block in super block XBLK3, which has fewer damaged blocks than the other super blocks. Afterwards, the controller 120 determines whether or not the block of the other superblocks corresponding to the damaged position 7 of the super blocks XBLK3 is normal. In the embodiment, the block in position 7 of super block XBLK4 is normal and the other blocks are all damaged. Accordingly, this is a perfect match with super block XBLK3. Therefore, the controller 120 merges super blocks XBLK3 and XBLK4 in order to obtain super block XBLK3, whose blocks are all normal, and it updates the recording table to become a non-compression table NDT4.

| Non-Compression Table NDT4 | | | | |
|---|---|---|---|---|
| | Storage Plane 160 | Storage Plane 161 | Storage Plane 162 | Storage Plane 163 |
| Position | 0  1 | 2  3 | 4  5 | 6  7 |
| Super block XBLK0 | 0  1 | 0  X | 0  1 | X  1 |
| Super block XBLK1 | 2  3 | X  3 | 2  X | 2  3 |
| Super block XBLK2 | 4  X | 4  5 | X  5 | 4  5 |
| Super block XBLK3 | 6  7 | 6  7 | 6  7 | 6  9 |

It should be noted that if the super block XBLK3 has two damaged blocks and two of other super blocks have respective normal block of the corresponding position, it means that the two super blocks and the super block XBLK3 are a perfect match. The controller 120 merges the two super blocks with super block XBLK3. In other words, the current super blocks are merged by the data control method of the present invention. The division will be performed if they cannot be merged. In other words, a super block will be divided into several sub-super blocks.

For example, the merging cannot be performed anymore for the non-compression table NDT4. However, the block merging and recovery have not been performed on super block XBLK0. The number of normal blocks in super block XBLK2 is greater than the number of damaged blocks in super block XBLK0, and the block of the super block XBLK2 corresponding to the damaged position of the super block XBLK0 is a normal block. Therefore, the controller 120 divides super block XBLK2 into two super blocks XBLK2_A and XBLK2_B (which are sub-super blocks).

The non-compression table NDT4 is also updated to become the non-compression table NDT5 shown below.

Non-Compression Table NDT5

|  | Storage Plane 160 | Storage Plane 161 | Storage Plane 162 | Storage Plane 163 | | | | |
|---|---|---|---|---|---|---|---|---|
| Position | 0 | 1 | 2 | 3 | 4 | 5 | 6 | 7 |
| Super block XBLK0 | 0 | 1 | 0 | X | 0 | 1 | X | 1 |
| Super block XBLK1 | 2 | 3 | X | 3 | 2 | X | 2 | 3 |
| Super block XBLK2_A | 4 | X | 4 | X | X | 5 | X | 5 |
| Super block XBLK2_B | X | X | X | 5 | X | X | 4 | X |
| Super block XBLK3 | 6 | 7 | 6 | 7 | 6 | 7 | 6 | 9 |

In the embodiment, the divided super block XBLK2_B and the super block XBLK0 are a perfect match. Therefore, the controller 120 merges the super blocks XBLK2_B and XBLK0 to recover the super block XBLK0. It should be noted that the super block XBLK1 has not been merged and recovered, the number of normal blocks in super block XBLK2_A is greater than the number of damaged blocks in super block XBLK1, and the block of the super block XBLK2_A corresponding to the damaged position of the super block XBLK1 is a normal block. Therefore, the controller 120 further divides the super block XBLK2_A into two super blocks XBLK2_A_1 and XBLK2_A_2 to recover the super block XBLK1. The recovered super block XBLK1 does not have any damaged blocks. The updated non-compression table NDT6 is illustrated below.

Non-Compression Table NDT6

|  | Storage Plane 160 | Storage Plane 161 | Storage Plane 162 | Storage Plane 163 | | | | |
|---|---|---|---|---|---|---|---|---|
| Position | 0 | 1 | 2 | 3 | 4 | 5 | 6 | 7 |
| Super block XBLK0 | 0 | 1 | 0 | 5 | 0 | 1 | 4 | 1 |
| Super block XBLK1 | 2 | 3 | X | 3 | 2 | X | 2 | 3 |
| Super block XBLK2_A_1 | X | X | 4 | X | X | 5 | X | X |
| Super block XBLK2_A_2 | 4 | X | X | X | X | X | X | 5 |
| Super block XBLK3 | 6 | 7 | 6 | 7 | 6 | 7 | 6 | 9 |

Because the divided super block XBLK_A_1 and the super block XBLK1 are a perfect match, the controller 120 merges the super blocks XBLK2_A_1 and XBLK1 to recover the super block XBLK1. The updated non-compression table NDT7 is illustrated below.

Non-Compression Table NDT6

|  | Storage Plane 160 | Storage Plane 161 | Storage Plane 162 | Storage Plane 163 | | | | |
|---|---|---|---|---|---|---|---|---|
| Position | 0 | 1 | 2 | 3 | 4 | 5 | 6 | 7 |
| Super block XBLK0 | 0 | 1 | 0 | 5 | 0 | 1 | 4 | 1 |
| Super block XBLK1 | 2 | 3 | 4 | 3 | 2 | 5 | 2 | 3 |
| Super block XBLK2_A_2 | 4 | X | X | X | X | X | X | 5 |
| Super block XBLK3 | 6 | 7 | 6 | 7 | 6 | 7 | 6 | 9 |

In the embodiment of the original non-compression table NDT3, each of the five super blocks XBLK0~XBLK4 is damaged. After utilizing the method of dividing and merging blocks provided by the present invention, three super blocks XBLK0, XBLK1 and XBLK3 which are all normal could be generated as shown in non-compression table NDT7. Therefore, the usage efficiency of the flash memory 140 can be greatly improved.

Figure 2:
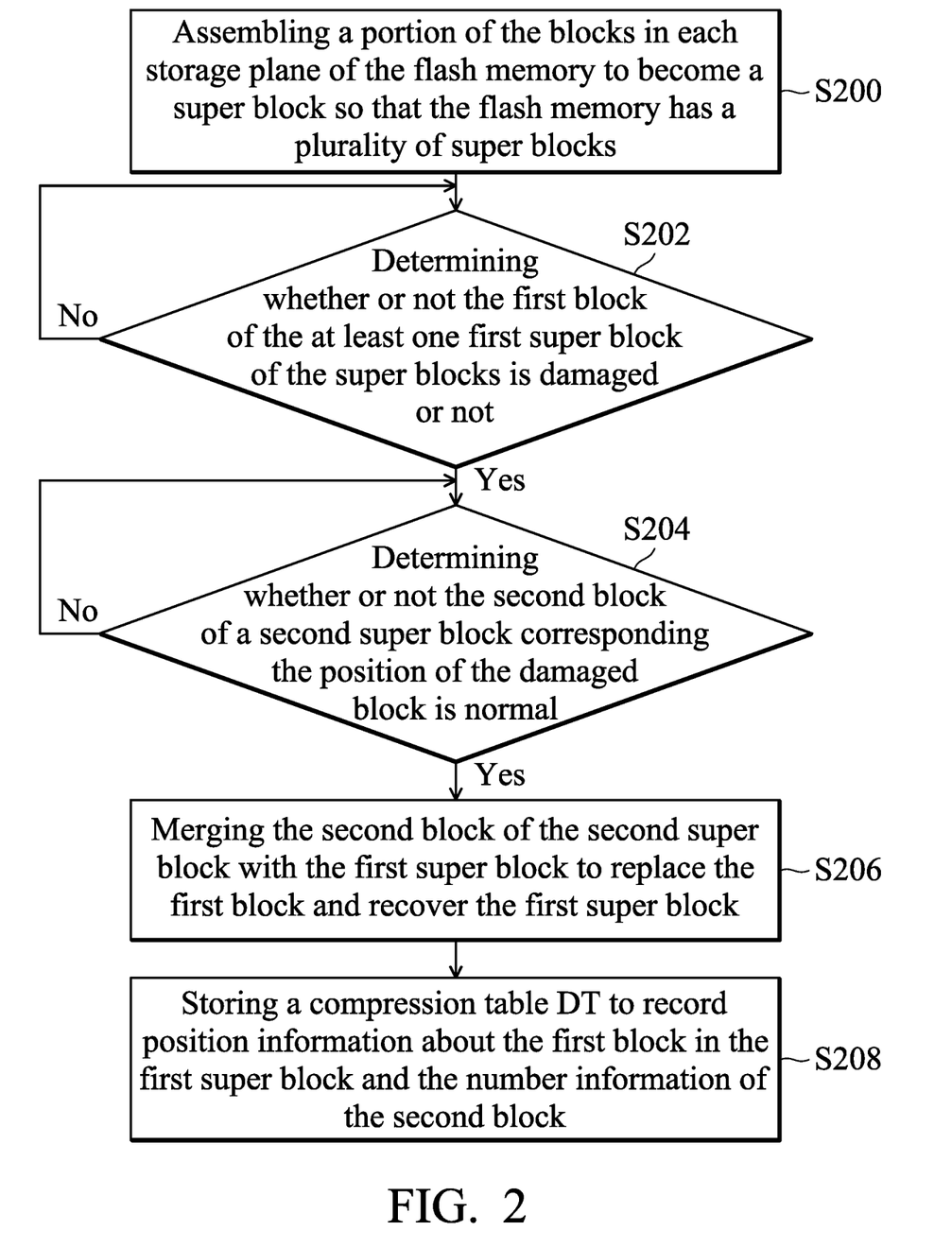
FIG. 2 is a flowchart illustrating the data storage method according to an embodiment of the invention.

FIG. 2 is a flowchart illustrating the data storage method according to an embodiment of the invention. In step S200, the controller 120 assembles a portion of the blocks in each storage plane 160~16N of the flash memory 140 to become a super block, so that the flash memory 140 has a plurality of super blocks. Afterwards, in step S202, the controller 120 determines whether or not the first block of the at least one first super block of the super blocks is damaged or not. If it is not damaged, step S202 will be executed again. If it is damaged, step S204 will be executed so that the controller 120 determines whether or not the second block of a second super block of the super blocks corresponding the position of the damaged block is a normal block.

If it is determined that the second block is not a normal block, step S204 will be executed again. If it is determined that the second block is a normal block, step S206 will be executed so that the controller 120 merges the second block of the second super block with the first super block to replace the first block and recover the first super block. Afterwards, in step S208, the RAM 180 stores a compression table DT to record position information about the first block in the first super block and the number information of the second block.

Figure 3:
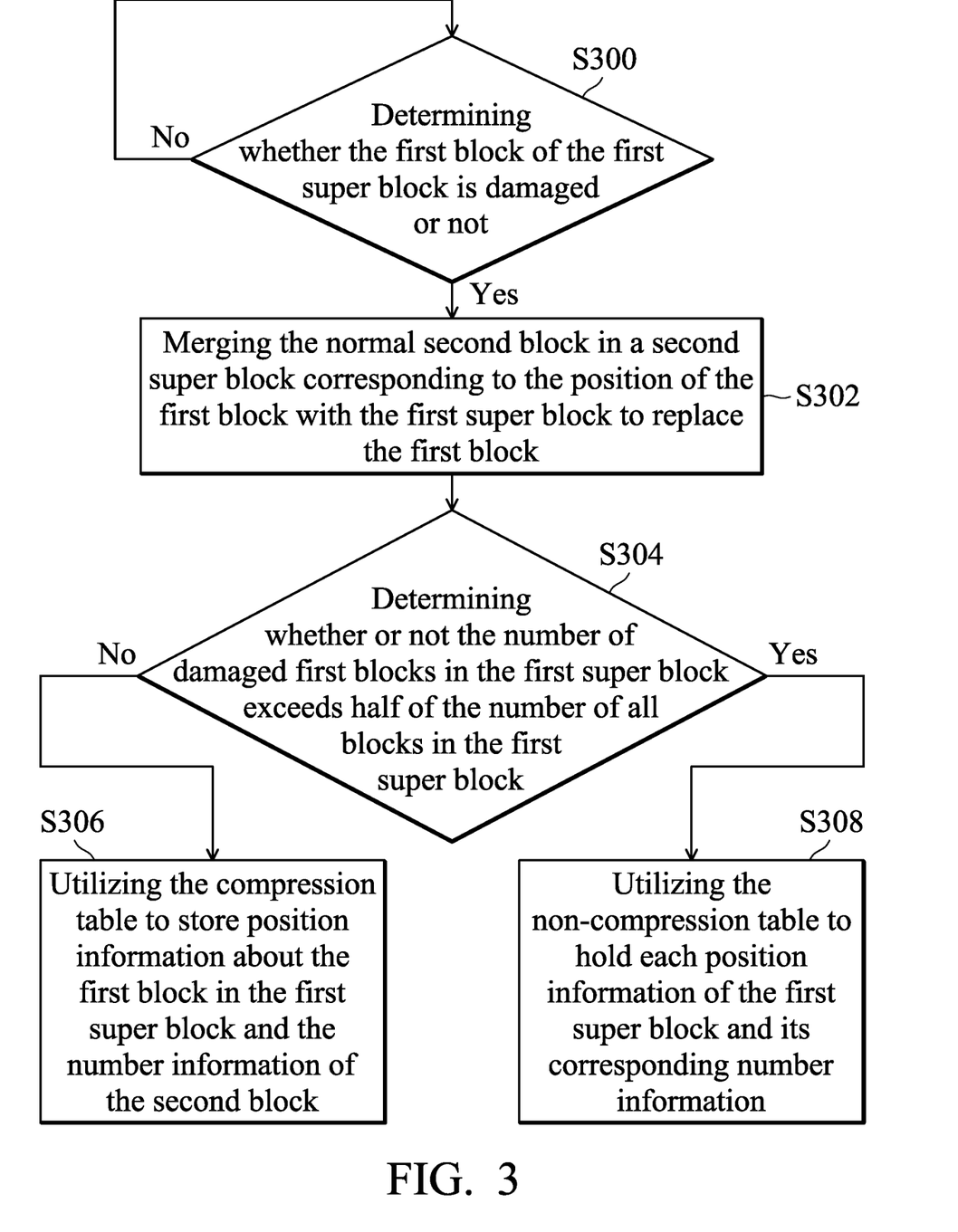
FIG. 3 is a flowchart illustrating the data storage method according to an embodiment of the invention.

FIG. 3 is a flowchart illustrating the data storage method according to an embodiment of the invention. In step S300, the controller 120 determines whether the first block of the first super block is damaged or not. If it is not damaged, step S300 will be executed again. If it is damaged, step S302 will be executed so that the controller 120 merges the normal second block in a second super block of the super blocks corresponding to the position of the first block with the first super block to replace the first block.

Afterwards, in step S304, the controller 120 determines whether or not the number of damaged first blocks in the first super block exceeds half of the number of all blocks in the first super block. If the number of damaged blocks does not exceed half of the number of all blocks, step S306 will be executed so that the controller 120 utilizes the compression table to store position information about the first block in the first super block and the number information of the second block. If the number of damaged blocks exceeds half of the number of all blocks, step S308 will be executed so that the controller 120 utilizes the non-compression table to hold each position information of the first super block and its corresponding number information.

Figure 4A:
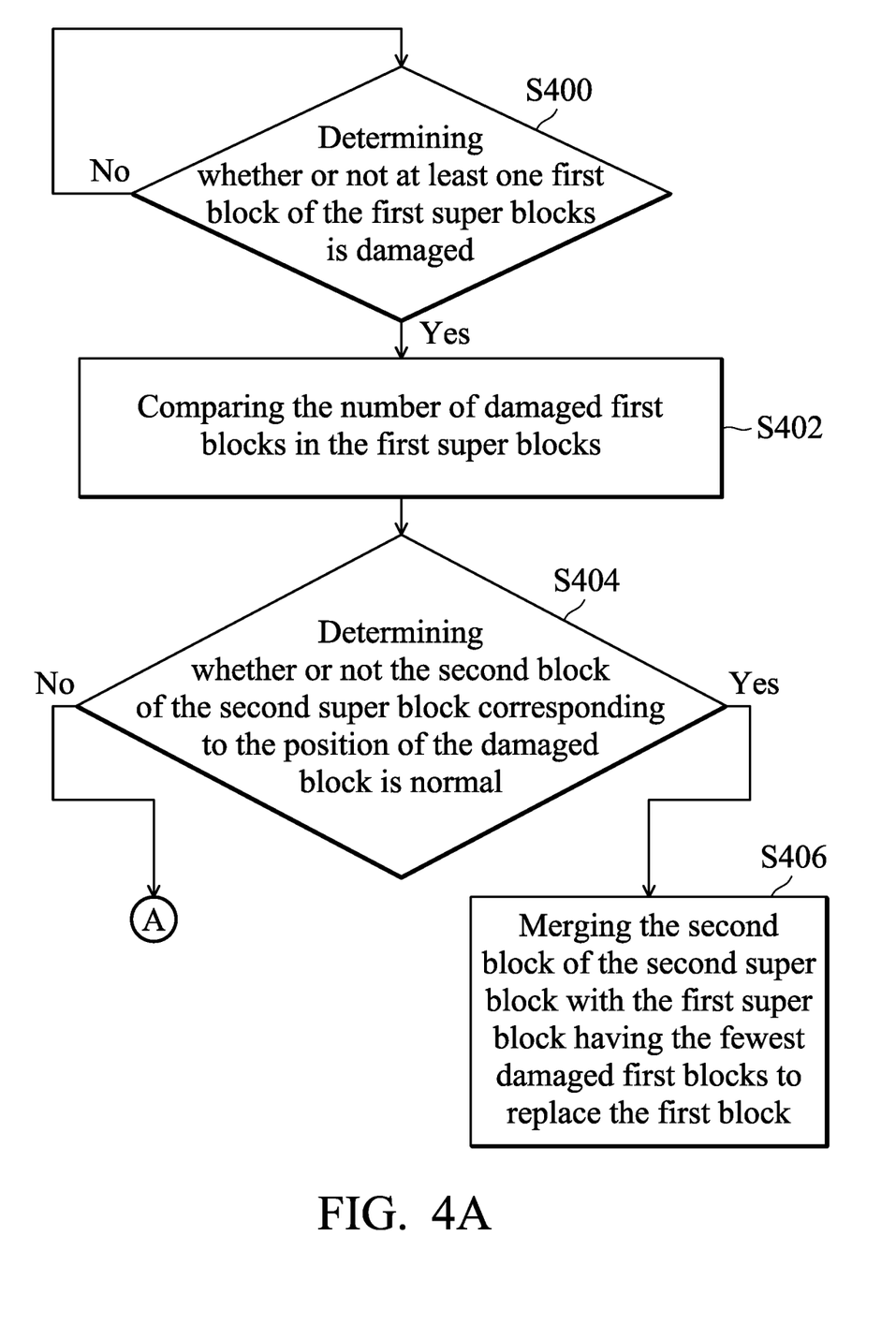
FIGS. 4A-4C are flowcharts illustrating the data storage method according to an embodiment of the invention.
Figure 4B:
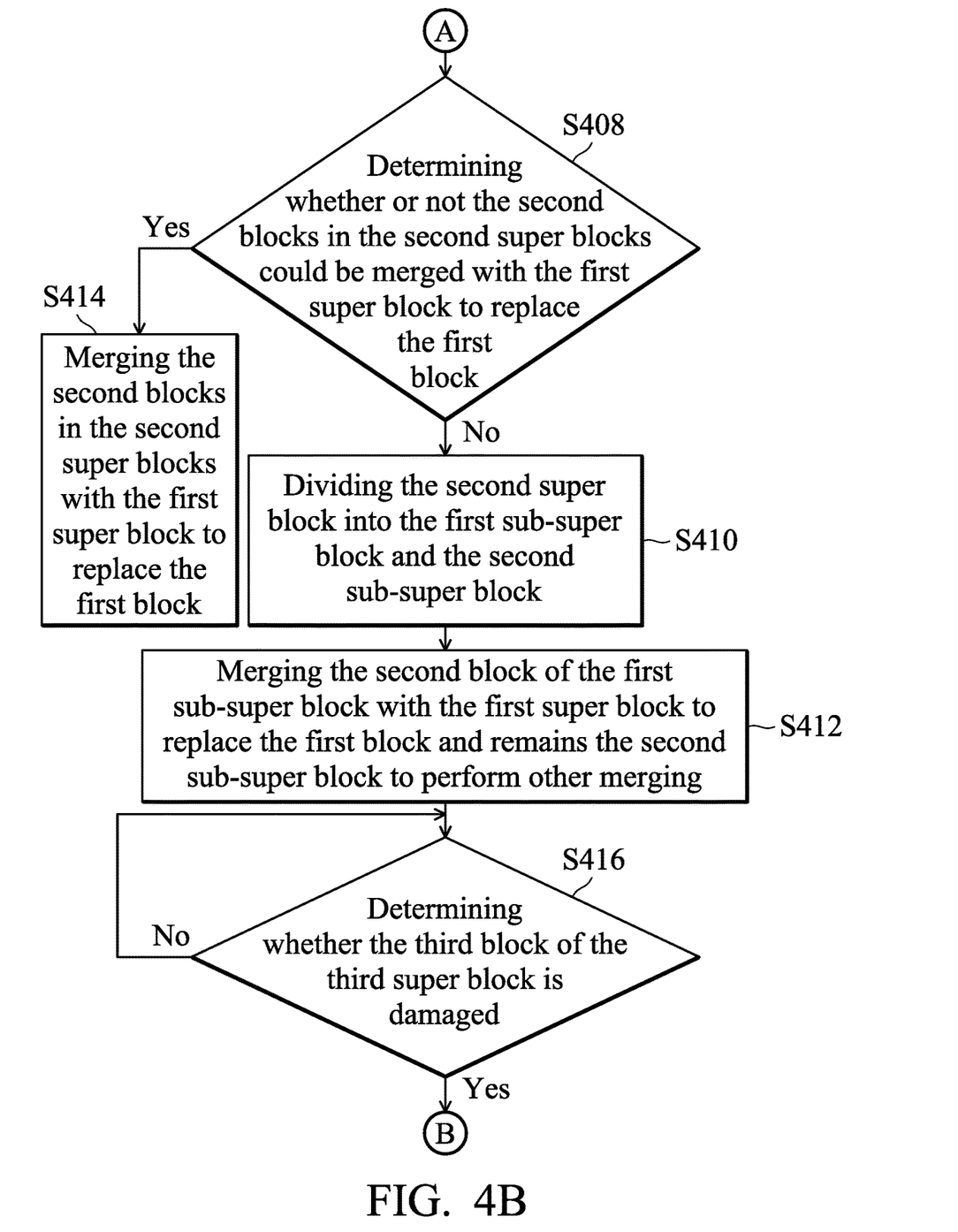
Figure 4C:
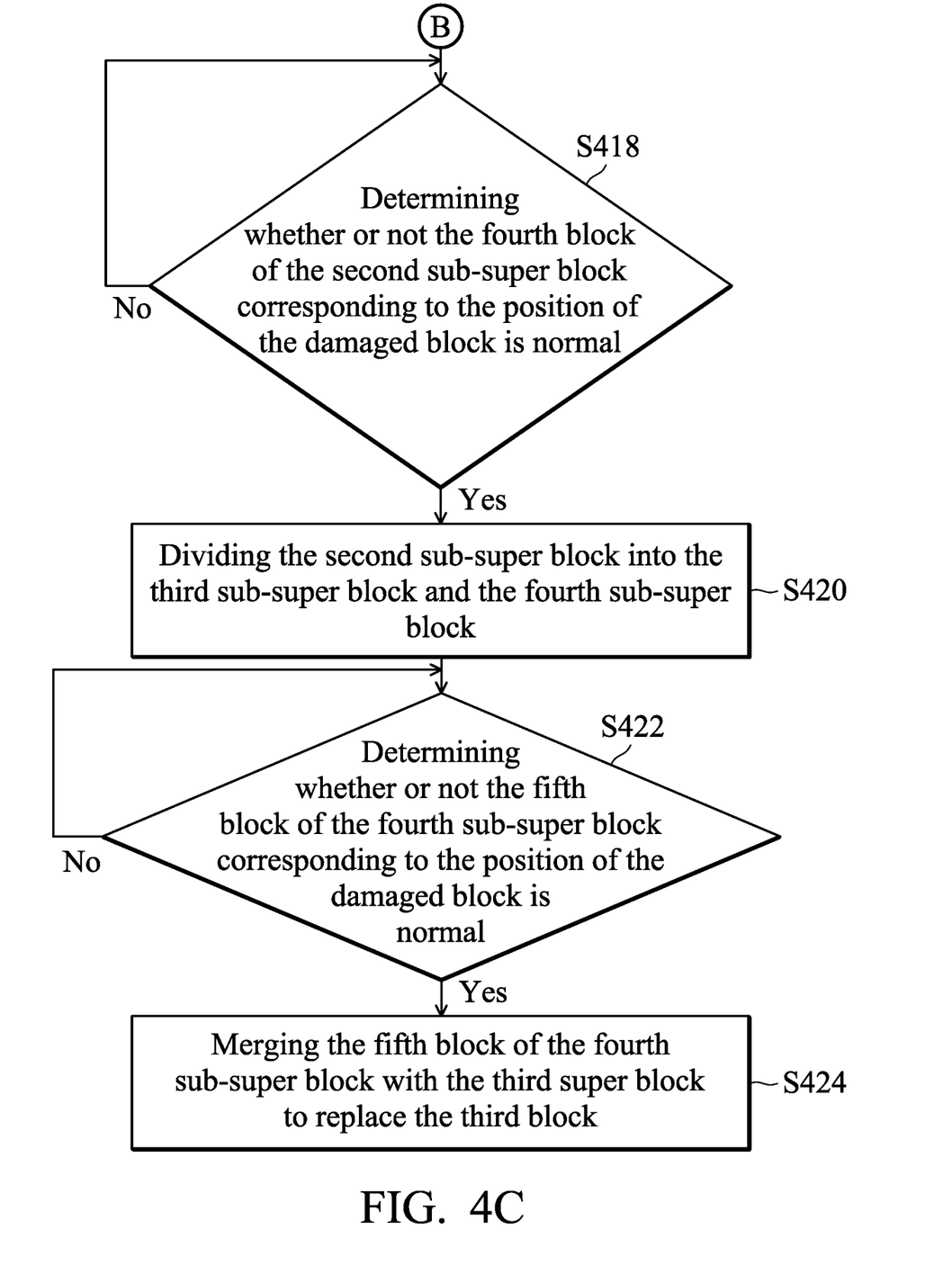

FIGS. 4A~4C are flowcharts illustrating the data storage method according to an embodiment of the invention. In step S400, the controller 120 determines whether or not at least one first block of the first super blocks is damaged. If it is not damaged, step S400 will be executed again. If it is damaged, step S402 will be executed so that the controller 120 compares the number of damaged first blocks in the first super blocks. In step S404, the controller 120 determines whether or not the second block of the second super block corresponding to the position of the damaged block is normal. If the second block is a normal block, step S406 will be executed so that the controller 120 merges the second block of the second super block with the first super block having the fewest damaged first blocks to replace the first block.

In addition, if the second block is a damaged block, step S408 will be executed so that the controller 120 determines whether or not the second blocks in the second super blocks could be merged with the first super block to replace the first block. If yes, step S414 will be executed so that the controller 120 merges the second blocks in the second super blocks with the first super block to replace the first block. If not, step S410 will be executed so that the controller 120 divides the second super block into the first sub-super block and the second sub-super block. Afterwards, step S412 will be executed so that the controller 120 merges the second block of the first sub-super block with the first super block to replace the first block and remains the second sub-super block to perform other merging.

Afterwards, in step S416, the controller 120 determines whether the third block of the third super block is damaged. If it is not damaged, step S416 will be executed again. If it is damaged, step S418 will be executed so that the controller 120 determines whether or not the fourth block of the second sub-super block corresponding to the position of the damaged block is normal, and the number of normal blocks in the second sub-super block is greater than the number of third blocks. If not, step S418 will be executed again. If yes, step S420 will be executed so that the controller 120 divides the second sub-super block into the third sub-super block and the fourth sub-super block.

Afterwards, step S422 will be executed so that the controller 120 determines whether or not the fifth block of the fourth sub-super block corresponding to the position of the damaged block is normal. If the fifth block is not a normal block, step S422 will be executed again. If the fifth block is a normal block, step S424 will be executed so that the controller 120 merges the fifth block of the fourth sub-super block with the third super block to replace the third block.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it should be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, comprising:
  a flash memory, comprising a plurality of storage planes, wherein each of the storage planes comprises a plurality of blocks, a portion of the blocks in each storage plane constitute a super block so that the flash memory comprises a plurality of super blocks; and
  a controller, coupled to the flash memory, wherein when at least one first block of at least one first super block of the super blocks is damaged, and at least one second block of at least one second super block of the super blocks corresponding to a position of the damaged block is normal, the controller merges the second block of the second super block with the first super block to replace the first block; and
  a random access memory (RAM), storing a compression table to record position information of the first block in the first super block and number information of the second block,
  wherein the controller determines whether or not a count of non-replaced damaged first blocks in the first super block is greater than half of a total number of all blocks in the first super block.

2. The data storage device as claimed in claim 1, wherein:
  when a data is not written into the first block successfully, or an erase operation is not performed successfully on the first block, the controller determines that the first block is damaged.

3. The data storage device as claimed in claim 1, wherein:
  when the count of non-replaced damaged first blocks in the first super block is greater than half of the total number of all blocks in the first super block, the RAM utilizes the compression table for recording; and
  when the count of non-replaced damaged first blocks in the first super block is not greater than half of the total number of all blocks in the first super block, the RAM utilizes a non-compression table for recording.

4. The data storage device as claimed in claim 3, wherein:
  the non-compression table is utilized to record each position information of the first super block and its corresponding number information.

5. The data storage device as claimed in claim 1, wherein:
  when the controller determines that the first super block has a plurality of damaged first blocks and second blocks in second super blocks of the super blocks corresponding to positions of respective first blocks are normal, the controller merges the second blocks in the second super blocks with the first super block to replace the first blocks.

6. The data storage device as claimed in claim 1, wherein:
  when the first block of the first super block is damaged, the second block of the second super block corresponding to the position of the damaged block is normal, and a count of normal blocks in the second super block is greater than a total number of first blocks, the controller divides the second super block into a first sub-super block and a second sub-super block, wherein the second block is located in the first sub-super block and the controller merges the second block in the first sub-super block with the first super block to replace the first block.

7. The data storage device as claimed in claim 6, wherein: when a third block in a third super block of the super blocks is damaged, and a fourth block of the second sub-super block corresponding to the position of the damaged block in the first super block is normal, the controller merges the fourth block of the second sub-super block with the third super block to replace the third block.

8. The data storage device as claimed in claim 7, wherein: when the third block of the third super block of the super blocks is damaged, the fourth block of the second sub-super block corresponding to the position of the damaged block in the first super block is normal, and a count of normal blocks in the second sub-super block is greater than the number of third blocks, the controller divides the second sub-super block into a third sub-super block and a fourth sub-super block; and when a fifth block in the fourth sub-super block corresponding to the position of the damaged block in the first super block is normal, the controller merges the fifth block in the fourth sub-super block with the third super block to replace the third block.

9. A data storage method for optimizing a data storage device, wherein the data storage device comprises a flash memory, a controller and a random access memory (RAM), and the flash memory comprises a plurality of storage planes, wherein each of the storage planes comprises a plurality of blocks, the data storage method comprising:

utilizing a portion of blocks in each storage plane to constitute a super block so that the flash memory comprises a plurality of super blocks; and when at least one first block of at least one first super block of the super blocks is damaged, and at least one second block of at least one second super block of the super blocks corresponding to a position of the damaged block is normal, merging the second block of the second super block with the first super block to replace the first block;

storing a compression table to record position information of the first block in the first super block and number information of the second block; and determining whether or not a count of non-replaced damaged first blocks in the first super block is greater than half of a total number of all blocks in the first super block.

10. The data storage method as claimed in claim 9, wherein:

when data is not written into the first block successfully, or an erase operation is not performed successfully on the first block, determining that the first block is damaged.

11. The data storage method as claimed in claim 9, wherein: when the count of non-replaced damaged first blocks in the first super block is greater than half of the total number of all blocks in the first super block, utilizing the compression table for recording; and when the count of non-replaced damaged first blocks in the first super block is not greater than half of the total number of all blocks in the first super block, utilizing a non-compression table for recording.

12. The data storage method as claimed in claim 11, wherein:

the non-compression table is utilized to record each position information of the first super block and its corresponding number information.

13. The data storage method as claimed in claim 9, wherein:

when the controller determines that the first super block has a plurality of damaged first blocks and second blocks in second super blocks of the super blocks corresponding to positions of respective first blocks are normal, the second blocks in the second super blocks are merged with the first super block to replace the first blocks.

14. The data storage method as claimed in claim 9, wherein:

when the first block in the first super block is damaged, the second block in the second super block corresponding to the position of the damaged block is normal, and a count of normal blocks in the second super block is greater than a total number of first blocks, the second super block is divided into a first sub-super block and a second sub-super block, wherein the second block is located in the first sub-super block, and the second block in the first sub-super block is merged with the first super block to replace the first block.

15. The data storage method as claimed in claim 14, wherein:

when a third block of a third super block of the super blocks is damaged, and a fourth block of the second sub-super block corresponding to the position of the damaged block in the first super block is normal, the fourth block of the second sub-super block is merged with the third super block to replace the third block.

16. The data storage method as claimed in claim 15, wherein:

when the third block of the third super block in the super blocks is damaged, the fourth block in the second sub-super block corresponding to the position of the damaged block is normal, and a count of normal blocks in the second sub-super block is greater than the number of third blocks, the second sub-super block is divided into a third sub-super block and a fourth sub-super block; and when a fifth block of the fourth sub-super block corresponding to the position of the damaged block in the first super block is normal, the fifth block of the fourth sub-super block is merged with the third super block to replace the third block.

* * * * *